March 7, 1961 J. L. CALLAHAN 2,974,110
MANUFACTURE OF SPHEROIDAL CATALYSTS
Filed Dec. 30, 1958
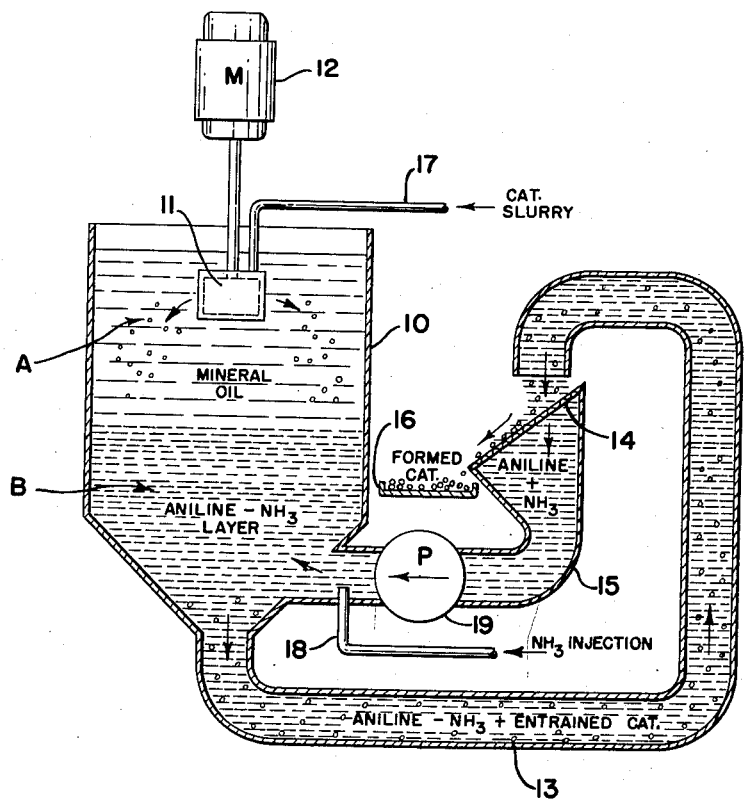
INVENTOR.
JAMES L. CALLAHAN
BY
ATTORNEY

United States Patent Office 2,974,110
Patented Mar. 7, 1961

2,974,110

MANUFACTURE OF SPHEROIDAL CATALYSTS

James L. Callahan, Bedford, Ohio, assignor to The Standard Oil Company, Cleveland, Ohio, a corporation of Ohio Filed Dec. 30, 1958, Ser. No. 783,812

3 Claims. (Cl. 252—448)

This invention relates to the manufacture of spheroidal catalysts. More particularly, it relates to the manufacture of spheroidal catalysts from acid-type constituents which are useful as catalysts in processes for the conversion of hydrocarbons.

The invention has particular applicability to the manufacture of catalysts comprising bismuth molybdate, mixtures of bismuth oxide and molybdenum oxide, bismuth phosphomolybdate, and mixtures of bismuth oxide, molybdenum oxide and phosphorous oxide as their principal active ingredients and they have been found to be particularly useful in processes for the partial oxidation of hydrocarbons. The invention is by no means limited to such catalysts, however, and it is applicable generally to the preparation of acidic-type catalysts such as silica-alumina, copper-silica, etc.

The invention is particularly directed to the preparation of spheroidal catalysts for use in either fixed-bed or fluidized types of catalytic reactors. Spheroidal catalysts are particularly desirable in such processes because other forms of catalyst such as molded pills, extruded pellets, broken or ground fragments and the like have certain inherent shortcomings which render them less than ideal for this use. For example, they are mechanically non-uniform, they are subject to fragmentation of exposed edges, and they do not pack efficiently so that fixed catalyst beds are subject to channeling, and fluidized systems are subject to attrition.

In brief, the process of my invention comprises the following steps. A slurry comprising the ingredients of the catalyst, at least some of which are water-soluble, is formed into globules of uniform small size which are caused to descend through an inert liquid having certain characteristics to be defined hereinafter whereby the globules assume a spherical shape. The spherical globules then descend through a second phase having basic and certain other characteristics which cause the globules to set quickly to semi-rigid spheroidal particles. These particles are next withdrawn from the basic phase. Thereafter they can be dried and calcined in accord with customary practice for use in catalytic processes, all of which latter steps are not a part of my invention.

My invention will be more readily understood by reference to the attached patent drawing which illustrates in diagrammatic form a simple apparatus which may be employed to carry out the process of my invention. The apparatus comprises a vessel 10 containing a two-phase liquid bath consisting of an inert upper layer A and a basic lower layer B. The basic lower layer consists essentially of aniline having ammonia dissolved therein. Generally, the amount of ammonia is at least 1% but preferably the aniline is saturated with ammonia (1.9 weight percent. A spinning basket 11 containing a number of small orifices is suspended near the top of the vessel 10. The basket 11 is rotated mechanically at variable speed by means such as the motor 12. The bottom of the vessel 10 is connected to a conduit 13 which permits liquid to be transferred from the vessel 10 to a screen 14 which is affixed to the upper end of a second conduit 15 which terminates in the vessel 10. A collection pan 16 is provided adjacent the screen 14 which is sloped downwardly so that solid materials dropping on the screen 14 will drop into the pan 16. A conduit 17 is provided for the introduction of the catalyst slurry into the basket 11. Another conduit 18 enters conduit 15 so that additional ammonia may be injected into the lower basic layer. The conduit 15 may also be provided with a pump 19 for transferring the liquid in conduit 15 back into the vessel 10 and which will also serve to insure the circulation of liquid in the conduit 13.

The process of this invention is carried out in the following manner. A catalyst slurry is introduced into the rotating basket 11 through the conduit 17. In the basket 11 small globules of the catalyst are forced out through the various orifices by means of centrifugal force. The size of the globules formed is dependent on the size of the orifices and the relative rotational speed of the basket, and either of these factors may be varied to produce globules of the size desired as will be obvious to the person skilled in the art. Small orifices and high speeds give small particles suitable for a fluidized reactor system and large orifices and slow speeds give larger particles suitable for a fixed-bed reactor system. By such adjustment the particle size can be varied from 1 cm. to less than 50 microns. The globules of catalyst which are thrown out from the basket 11 descend downwardly through the inert liquid medium A.

Medium A must be immiscible and inert with respect to the catalyst slurry; it must also have a density lower than either medium B or the globules of the catalyst slurry. A further requirement of medium A is that it is inert with respect to medium B and especially such that ammonia and aniline should be substantially insoluble in it. The viscosity of medium A should be sufficient to cause the globules issuing from the basket 11 to form spheroidal particles before they reach the interface between medium A and medium B. I have found that neutral mineral lubricating oils having a viscosity of about 50 to 500 S.S.U. at 100° F. are particularly useful as the medium A but non-hydrocarbons may also be used such as, for example, ethers, ketones, aldehydes, esters, alcohols, etc. which meet the desiderata set forth above for medium A.

The globules of the catalyst slurry which are now in spheroidal form after passing through medium A enter medium B which consists essentially of aniline and dissolved ammonia. In medium B the globules quickly set to semi-rigid spheroidal particles and descend therethrough since the aniline-ammonia solution which makes up medium B has a density lower than the catalyst slurry. The use of the aniline-ammonia solution is to be contrasted with aqueous ammonia solutions which would cause disintegration of the globules by dissolving out soluble catalyst components. The semi-rigid spheroidal particles formed in medium B will collect at the entrance to conduit 13 where they are picked up in a flowing stream of medium B and carried to the outlet of conduit 13. This mixture of liquid and catalyst particles will then fall on the screen 14 which has openings of a size sufficient to retain all of the catalyst but which will permit the liquid to pass freely therethrough. The catalyst particles will drop off the inclined screen 14 into the collection pan 16 while the liquid is recycled to the vessel 10 by means of conduit 15 and pump 19. Since there may be some loss of ammonia to the atmosphere, or due to consumption because of the neutralization, it may be necessary at times to introduce make-up ammonia through the line 18 in order to maintain the aniline layer saturated with ammonia. It may also be desirable to remove water from the medium B if it becomes unduly diluted, or otherwise reconstitute it.

The residence time of the spheroids in medium B is regulated so that they gel and become sufficiently rigid and strong, to be handled mechanically or hydraulically without fracture. Gelation of the globules occurs instantaneously in the lower layer, but a residence time up to 20 minutes or more can be used if desirable. The spheroids collected in the pan 16 are usually washed with a solvent such as acetone, alcohol, or mixtures thereof to remove the excess aniline. Alternatively the aniline can be steam stripped from the spheroids or, if not, will be eliminated during further processing. They are then dried slowly at temperatures between about 150 to 400° F. until substantially dry. It is desirable that the entire surface of the spheroidal particles be dried uniformly to prevent deformation thereof. After the drying has reached the desired degree of completion, the particles may be calcined to free them from volatile and oxidizable components at temperatures between about 700 and 1200° F. for about 1 to 24 hours, preferably between about 900 and 1150° F. for 3 to 12 hours.

My invention will be more fully understood from the following specific examples:

This example illustrates the preparation of a bismuth molybdate catalyst according to the process of this invention. The catalyst slurry was prepared in the following manner:

177 grams of ammonium molybdate was dissolved in 200 cc. of water. This solution was then added to 1084 grams of a low alkali aqueous silica solution containing 30% silica (H.S. "Ludox"). Next, 364 grams of bismuth nitrate was dissolved in 200 cc. of a 5.25% nitric acid solution. The latter solution was then added to the previously formed solution.

The resulting slurry was introduced into the apparatus described above and treated in accordance with the procedure outlined above. The basket contained holes $\frac{1}{32}''$ in diameter and was driven at a speed of 5,000 r.p.m. Medium A was a neutral paraffinic oil having a viscosity of 95 S.S.U. at 100° F. Medium B was aniline saturated with ammonia. The operation was conducted at room temperature. The spheroidal catalyst which resulted from this operation was washed with a mixture of 95% methylisobutyl ketone and 5% acetone to remove residual aniline. The catalyst was dried at a temperature of 390° F. for 36 hours. As the final step in the catalyst preparation, the catalyst was calcined at 800° F. for 12 hours. The resulting catalyst was found to possess a uniform spheroidal shape, over 60% of the particles were less than 250 microns in diameter. This catalyst was compared with a catalyst possessing the identical composition but prepared by the more conventional method of grinding and screening. It was found that the attrition resistance of the catalyst prepared in accordance with the method of this invention was 75 to 100% better than the catalyst prepared by the conventional drying and grinding method. The catalyst prepared in accordance with this invention also possessed excellent catalytic properties.

A phosphorous promoted bismuth molybdate catalyst can be prepared by (1) dissolving 146 grams of $Bi(NO_3)_3 \cdot 5H_2O$ in 40 cc. $H_2O$ and precipitating the bismuth as the hydrous oxide by adding 52 cc. of $NH_4OH$ solution (28% $NH_3$). The precipitate is washed and reslurried in 60 cc. $H_2O$. (2) 70 grams of $$(NH_4)_6Mo_7O_{24} \cdot 4H_2O$$

was added to 80 cc. $H_2O$ at boiling temperature. (3) 2.3 ml. of 85% $H_3PO_4$ was added to 434 grams of the low alkali silica (H.S. "Ludox") with stirring. The slurries formed by Steps (1) and (2) were added to (3) with stirring and the resulting slurry was then processed as above.

Several additional catalysts were prepared in order to demonstrate the improvements obtainable by means of this invention. A silica-alumina catalyst was prepared by dissolving 22.5 grams of $Al(NO_3)_3 \cdot 9H_2O$ in 70 mls. of water and adding this to 96 grams of the low alkali silica solution ("Ludox"). The slurry was processed in the same manner. A cupric oxide-silica catalyst was prepared by dissolving 46 grams of $Cu(NO_3)_2 \cdot 3H_2O$ in 100 mls. of water which was added to 150 grams of the low alkali silica solution ("Ludox"). $HNO_3$ was added until the pH was 3. The slurry was processed in the same manner. I found that these products prepared by the process of this invention had a uniform spheroidal shape with smooth, glossy surfaces and that their attrition resistance was far superior to identical compositions prepared by more conventional methods.

In view of the foregoing disclosure, it will be obvious to persons skilled in the art that various modifications of the procedure described herein may be made without departing from the spirit and scope of this invention. Accordingly, this application for Letters Patent is intended to cover all such modifications as would reasonably fall within the scope of the appended claims.

I claim:

1. A process for the manufacture of catalysts having a small uniform spheroidal shape from a liquid slurry containing acidic catalyst constituents at least some of which are water soluble which comprises the following steps: (1) forming small globules of uniform size from said liquid slurry of the catalyst constituents, (2) causing said small globlues to fall by gravity through a liquid bath comprising an upper layer consisting of a liquid inert to said slurry and the hereinafter-mentioned lower layer, whereby said small globules assume a uniform spheroidal shape, and then fall through a lower layer consisting essentially of a solution of ammonia in aniline whereby said small uniform spheroidal globules descending from said upper layer set into semi-rigid spheroidal particles, and finally (3) recovering said semi-rigid spheroidal particles from said liquid bath.

2. A process for the manufacture of catalysts having a small uniform spheroidal shape from a liquid slurry containing acidic catalyst constituents at least some of which are water-soluble, which process comprises the following steps: (1) forming small globules of uniform size from said liquid slurry of the catalyst ingredients, (2) causing said small globules to fall by gravity through a liquid bath comprising an upper layer consisting of a neutral lubricating oil having a viscosity of 50 to 500 S.S.U. at 100° F., whereby said small globules assume a uniform spheroidal shape, and then fall through a lower layer consisting esssntially of a saturated solution of ammonia in aniline whereby said small uniform spheroidal globules descending from said upper layer set into semi-rigid spheroidal particles, and finally (3) recovering said semi-rigid spheroidal particles from said liquid bath.

3. A process for the manufacture of catalysts having a small uniform spheroidal shape from a liquid slurry containing acidic catalyst constituents comprising components forming a bismuth molybdate salt, at least some of which are water-soluble, which process comprises the following steps: (1) forming small globules of uniform size from said liquid slurry of the catalyst ingredients, (2) causing said small globules to fall by gravity through a liquid bath comprising an upper layer consisting of a neutral lubricating oil having a viscosity of 50 to 500 S.S.U. at 100° F., whereby said small globules assume a uniform spheroidal shape, and then fall through a lower layer consisting essentially of a saturated solution of ammonia in aniline whereby said small uniform spheroidal globules descending from said upper layer set into semi-rigid spheroidal particles, and finally (3) recovering said semi-rigid spheroidal particles from said liquid bath.

References Cited in the file of this patent

UNITED STATES PATENTS 2,450,394    Brown et al.    Sept. 28, 1948
2,492,808    Marisic et al.    Dec. 27, 1949